(12) United States Patent
Yanai et al.

(10) Patent No.: US 6,399,164 B1
(45) Date of Patent: Jun. 4, 2002

(54) LIQUID CRYSTAL COMPOSITION AND LIQUID CRYSTAL DISPLAY ELEMENT

(75) Inventors: Motoki Yanai; Yasuhiro Kubo; Etsuo Nakagawa, all of Chiba (JP)

(73) Assignee: Chisso Corporation, Osaka (JP)

( * ) Notice: Subject to any disclaimer, the term of this patent is extended or adjusted under 35 U.S.C. 154(b) by 136 days.

(21) Appl. No.: 09/624,139

(22) Filed: Jul. 21, 2000

(30) Foreign Application Priority Data

Jul. 21, 1999 (JP) ............................................. 11-206701

(51) Int. Cl.[7] .......................... C09K 19/30; C09K 19/12

(52) U.S. Cl. ............... 428/1.1; 252/299.63; 252/299.66

(58) Field of Search ...................... 252/299.63, 299.66; 428/1.1

(56) References Cited

U.S. PATENT DOCUMENTS

| | | | | | |
|---|---|---|---|---|---|
| 5,106,530 A | * | 4/1992 | Haas et al. | ............... | 252/299.6 |
| 5,993,690 A | * | 11/1999 | Kondo et al. | ............ | 252/299.6 |

FOREIGN PATENT DOCUMENTS

| | | | |
|---|---|---|---|
| JP | 57-1658328 | | 10/1982 |
| JP | 59-70624 | | 4/1984 |
| JP | 60-16940 | | 1/1985 |
| JP | 6-228037 | | 8/1994 |
| JP | 2001-262145 | * | 9/2001 |
| WO | 97/05144 | | 2/1997 |

OTHER PUBLICATIONS

Kiefer, et al., "In–Plane Switching of Nematic Liquid Crystals", Japan Display '92, pp. 547–550 (1992).
Ohmuro et al., "Development of Super–High–Image–Quality Vertical–Alignment–Mode LCD", SID 97 Digest, pp. 845–848 (1997).

* cited by examiner

*Primary Examiner*—Shean C Wu
(74) *Attorney, Agent, or Firm*—Wenderoth, Lind & Ponack, L.L.P.

(57) ABSTRACT

The present invention provides a liquid crystal composition comprising a component I comprising at least one compound selected from the group of compounds represented by Formula (I) and a component II comprising at least one compound selected from the group of compounds represented by Formulas (II-1) and (II-2):

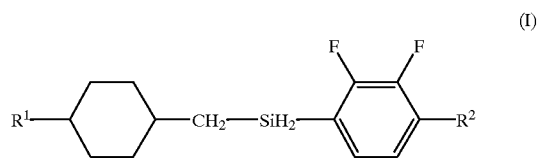

(I)

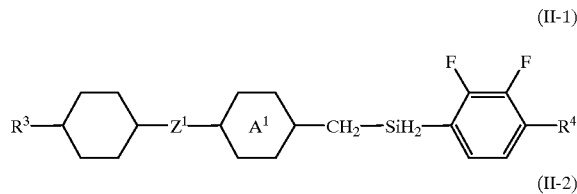

(II-1)

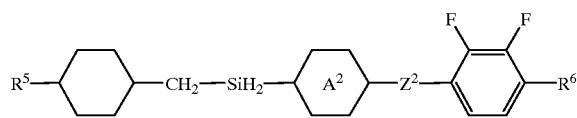

(II-2)

wherein $R^1$, $R^3$ and $R^5$ each represent independently an alkyl group having C1 to C10 or an alkenyl group having C2 to C10; $R^2$, $R^4$ and $R^6$ each represent independently an alkyl group or alkoxy group having C1 to C10 or an alkenyl-group having C2 to C10; $Z^1$ and $Z^2$ each represent independently a single bond or —$CH_2CH_2$—; and rings $A^1$ and $A^2$ each represent independently trans-1,4-cyclohexylene, 1,4-phenylene or 1,4-phenylene in which at least one hydrogen atom is substituted with a fluorine atom. The liquid crystal composition has a suitable value of Δn, a low viscosity, a large negative Δ∈, a wide nematic phase range and a high voltage-holding ratio while satisfying various characteristics required to a liquid crystal composition for an AM-LCD.

8 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates to a nematic liquid crystal composition having a negative dielectric anisotropic value and a liquid crystal display element using the said liquid crystal composition. More specifically, the present invention relates to a liquid crystal composition having a negative dielectric anisotropic value for an active matrix liquid crystal display element and a liquid crystal display element using the said liquid crystal composition.

2. Description of the Related Art

A liquid crystal display element (LCD) enables a low power consumption, a reduction in a size and a reduction in a weight as compared with CRT (Braun tube system display), therefore various LCD's such as a twist nematic (TN) mode, a super twist nematic (STN) mode and a thin film transistor (TFT) mode have been put to practical use. Among them, an active matrix LCD (AM-LCD) such as a thin film transistor (TFT) mode is advanced in conversion to color display and highly fine display, and therefore it attracts attentions as the most likely candidate of flat display.

Characteristics required to this liquid crystal composition for an AM-LCD includes:

1) a voltage-holding ratio (VHR) elevated in order to maintain a high contrast of LCD,
2) a nematic liquid crystal phase range expanded according to use environment,
3) a suitable optical anisotropic value ($\Delta n$) held according to a cell thickness, and
4) a suitable threshold voltage held according to a driving circuit.

A TN display mode in which alignment of liquid crystal molecules between the upper and lower electrode substrates is twisted by 90° has been the mainstream in an operating mode of an AM-LCD, but there has been the defect that the narrow angle of visibility thereof makes it difficult to apply it to a large picture plane. Then, proposed as modes for improving an angle of visibility are:

a) an IPS display mode in which a liquid crystal display element shows a homogeneous aligning state in applying no voltage and a liquid crystal molecule rotates by 45 to 90° in a face in applying voltage (R. Kiefer, B. Weber. F. Windscheid and G. Baur, "In-Plane Switching of Nematic Liquid Crystals", JAPAN DISPLAY '92, p. 547), and b) a VA display mode in which a liquid crystal display element shows a homeotropic aligning state in applying no voltage and changes to an aligning state of a horizontal direction in applying voltage (K. Ohmuro, S. Kataoka, T. Sasaki and Y. Koike "Development of Super-High-Image-Quality Vertical-Alignment-Mode LCD", SID 97 DIGEST, p. 845).

These display modes not only can achieve a wide angle of visibility but also have the characteristics of a high speed response and a high contrast. Further, they have the large characteristic that a liquid crystal composition having a negative dielectric anisotropic value ($\Delta\varepsilon$) can be applied thereto.

These operating modes make use of a birefringence mode (electrically controlled birefringence mode). A product $\Delta n \cdot d$ of an optical anisotropic value ($\Delta n$) and a cell thickness (d) has to be set to some fixed value (for example, $\Delta n \cdot d$: 0.275 μm) in order to obtain an optimum contrast. Accordingly, a value falling in the extent of roughly 0.05 to 0.13 is requested for the value of $\Delta n$ applying to 2–6 μm of a cell thickness (d). A response time is proportional to a viscosity (hereinafter abbreviated as η) of a liquid crystal composition, and therefore a liquid crystal composition having a small η is required. Further, the larger the absolute value of dielectric anisotropic value (hereinafter abbreviated as $\Delta\varepsilon$) is, the more the threshold voltage is lowered, and therefore a liquid crystal composition having a large negative $\Delta\varepsilon$ is required.

As described above, a liquid crystal compositions have intensively been investigated according to various purposes, but the existing state is that a novel improvement thereof is always required.

SUMMARY OF THE INVENTION

An object of the present invention is to provide a liquid crystal composition which has a suitable value of $\Delta n$, a low viscosity, a large negative $\Delta\varepsilon$, a wide nematic phase range and a high voltage-holding ratio while satisfying various characteristics required to the liquid crystal composition for AM-LCD described above so that it can be applied to the IPS display mode a) and the VA display mode b) described above which enable to achieve a wide angle of visibility.

The present inventors have intensively investigated compositions using various liquid crystal compounds in order to solve these problems, and as a result thereof, they have found that the expected object can be achieved by a liquid crystal composition comprising a component I comprising at least one compound selected from the group of compounds represented by Formula (I) and a component II comprising at least one compound selected from the group of compounds represented by Formulas (II-1) and (II-2). Thus, they have come to complete the present invention.

A first liquid crystal composition of the present invention is shown by the following items (1) and (2):

(1) A liquid crystal composition comprising a component I comprising at least one compound selected from the group of compounds represented by Formula (I) and a component II comprising at least one compound selected from the group of compounds represented by Formulas (II-1) and (II-2):

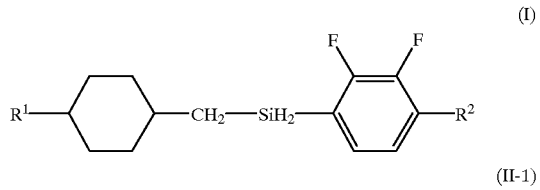

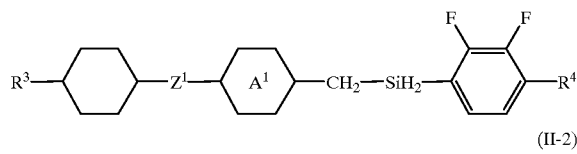

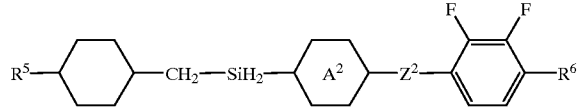

wherein $R^1$, $R^3$ and $R^5$ each represent independently an alkyl group having 1 to 10 carbon atoms or an alkenyl group having 2 to 10 carbon atoms; $R^2$, $R^4$ and $R^6$ each represent independently an alkyl group or alkoxy group having 1 to 10 carbon atoms or an alkenyl group having 2 to 10 carbon atoms; $Z^1$ and $Z^2$ each represent independently a single bond or —$CH_2CH_2$—; and rings $A^1$ and $A^2$ each represent independently trans-1,4-cyclohexylene, 1,4-phenylene or 1,4-phenylene in which at least one hydrogen atom is substituted with a fluorine atom.

(2) A liquid crystal composition as described in the above item (1), wherein the component I accounts for 3 to 40% by weight, and the component II accounts for 3 to 80% by weight each based on the whole weight of the liquid crystal composition.

A second liquid crystal composition of the present invention is shown by the following items (3) and (4):

(3) A liquid crystal composition as described in any one of the above items (1) and (2), comprising a component III comprising at least one compound selected from the group of compounds represented by Formulas (III-1), (III-2), (III-3) and (III-4):

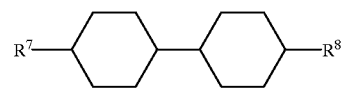
(III-1)

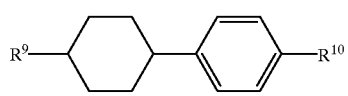
(III-2)

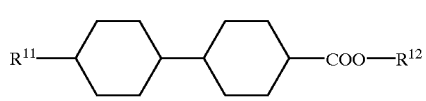
(III-3)

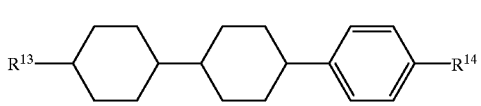
(III-4)

wherein $R^7$, $R^9$, $R^{11}$ and $R^{13}$ each represent independently an alkyl group having 1 to 10 carbon atoms or an alkenyl group having 2 to 10 carbon atoms; and $R^8$, $R^{10}$, $R^{12}$ and $R^{14}$ each represent independently an alkyl group or alkoxy group having 1 to 10 carbon atoms or an alkenyl group having 2 to 10 carbon atoms.

(4) A liquid crystal composition as described in the above item (3), comprising the component I of 3 to 40% by weight, the component II of 3 to 80% by weight and the component III of 1 to 80% by weight each based on the whole weight of the liquid crystal composition.

A third liquid crystal composition of the present invention is shown by the following item (5): (5) A liquid crystal composition as described in any one of the above items (3) and (4), comprising a component IV comprising at least one compound selected from the group of compounds represented by Formulas (IV-1), and (IV-2):

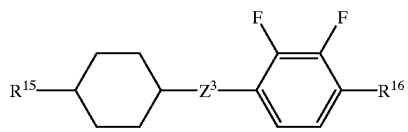
(IV-1)

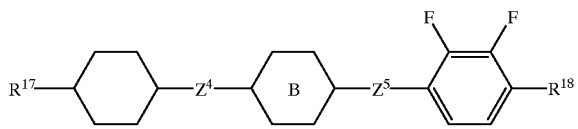
(IV-2)

wherein $R^{15}$ and $R^{17}$ each represent independently an alkyl group having 1 to 10 carbon atoms or an alkenyl group having 2 to 10 carbon atoms; $R^{16}$ and $R^{18}$ each represent independently an alkyl group or alkoxy group having 1 to 10 carbon atoms or an alkenyl group having 2 to 10 carbon atoms; $Z^3$, $Z^4$ and $Z^5$ each represent independently a single bond or —$CH_2CH_2$—; and a ring B represents 1,4-phenylene or trans-1,4-cyclohexylene.

A liquid crystal display element of the present invention is shown by the following item (6):

(6) A liquid crystal display element comprising the liquid crystal composition as described in any one of the above items (1) to (5).

DESCRIPTION OF THE PREFERRED EMBODIMENTS

The component I in the liquid crystal composition of the present invention comprises the compound represented by Formula (I), and it has an optical anisotropic value (Δn) falling in a range of roughly 0.05 to 0.09 and a dielectric anisotropic value (Δ∈) falling in a range of roughly −6 to −4 and is excellent in a heat stability, a chemical stability and a miscibility. Accordingly, the component I assumes a role to reduce a threshold voltage and a viscosity in a liquid crystal composition for a TFT in which a high reliability is required. However, the clearing point (Tc) falls in a range of roughly −50 to −20° C., and therefore if a composition having a negative Δ∈ is prepared only from these compounds, the composition has a low clearing point (Tc) and therefore is not preferred.

The component II comprises the compound represented by Formula (II-1) and (II-2), and it has an optical anisotropic value (Δn) falling in a range of roughly 0.08 to 0.170, a dielectric anisotropic value (Δ∈) falling in a range of roughly −6 to −3 and a clearing point (Tc) falling in a range of roughly 60 to 100° C. This component II is excellent in a heat stability, a chemical stability and a miscibility and therefore assumes a role to elevate a clearing point Tc as well as further reducing a threshold voltage in the liquid crystal composition.

The preferred compounds of the component II include the following compounds. $R^3$ to $R^6$ in the formulas are synonymous with the definitions described above.

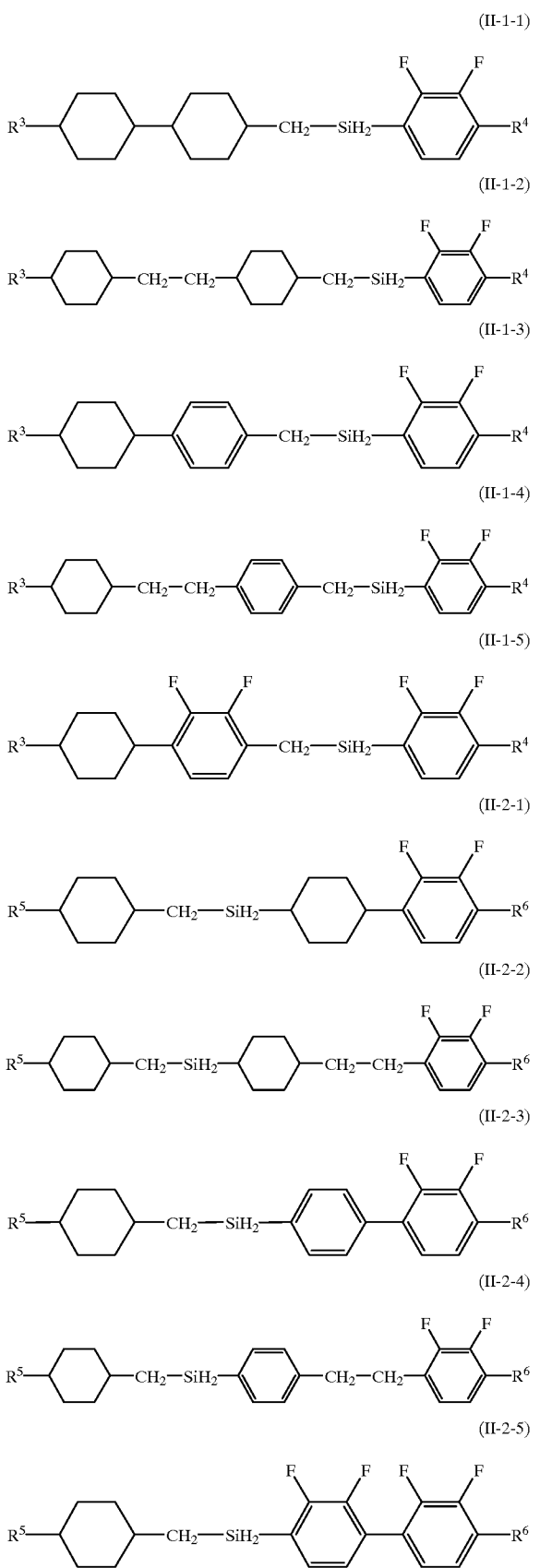

The first liquid crystal composition of the present invention can be prepared by optionally combining several kinds of the component I with several kinds of the component II and further adding other components, if necessary. This combination of the component I with the component II makes it possible to prepare a liquid crystal composition for an AM-LCD which is intended in the present invention and which has a suitable Δn, a low viscosity, a large negative dielectric anisotropic value, a wide nematic liquid crystal phase range and a high voltage-holding ratio (VHR) That is, capable of being obtained is a liquid crystal composition which has a clearing point (Tc) falling in a range of roughly 60 to 90° C., an optical anisotropic value (Δn) falling-in a range of roughly 0.06 to 0.12 and a dielectric anisotropic value (Δ∈) falling in a range of roughly −5 to −3 and which has a low viscosity, a wide nematic phase range and a high voltage-holding ratio.

The second liquid crystal composition of the present invention can be prepared by optionally combining several kinds of the component I, the component II and the component III and further adding other components, if necessary. The second liquid crystal composition is obtained by adding this component III to the first liquid crystal composition, and it is possible to prepare a composition having a higher clearing point, a smaller optical anisotropic value and a lower viscosity than those of the first liquid crystal composition. That is, capable of being obtained is a liquid crystal composition which has a clearing point (Tc) falling in a range of roughly 60 to 120° C., an optical anisotropic value (Δn) falling in a range of roughly 0.05 to 0.10 and a dielectric anisotropic value (Δ∈) falling in a range of roughly −4 to −1 and which has a low viscosity, a wide nematic phase range and a high voltage-holding ratio. The second composition is as suitable for a liquid crystal composition for an AM-LCD as the first composition.

The compounds represented by Formulas (III-1), (III-2) and (III-3) in the component III have a clearing point (Tc) falling in a range of roughly 10 to 80° C. and an optical anisotropic value (Δn) falling in a range of roughly 0.01 to 0.07 and therefore assume a role to reduce a Δn in the liquid crystal composition. Further, the compounds represented by Formulas (III-1) and (III-2) assume as well a role to reduce particularly a viscosity of the composition. The compound represented by Formula (III-4) has an optical anisotropic value (Δn) falling in a range of roughly 0.10 to 0.15 and a clearing point (Tc) falling in a range of roughly 130 to 190° C. and therefore assume a role to elevate particularly a clearing point (Tc).

The third liquid crystal composition of the present invention can be prepared by optionally combining several kinds of the component I, the component II, the component III and the component IV and further adding other components, if necessary. That is, the third liquid crystal composition which is as suitable for a liquid crystal composition for an AM-LCD as the first and second compositions of the present invention can be prepared by combining the preceding second liquid crystal composition of the present invention with the component IV. The liquid crystal composition in which a value of Δ∈ is more finely controlled than those of the first and second liquid crystal compositions can be obtained by adding this component IV.

In the component IV, the compound represented by Formula (IV-1) has a clearing point (Tc) falling in a range of roughly −20 to 30° C., an optical anisotropic value (Δn) falling in a range of roughly 0.06 to 0.12 and a dielectric anisotropic value (Δ∈) falling in a range of roughly −7 to −3 and is excellent in a heat stability and a chemical stability.

The compound represented by Formula (IV-2) has a clearing point (Tc) falling in a range of roughly 120 to 180° C., an optical anisotropic value (Δn) falling in a range of roughly 0.08 to 0.21 and a dielectric anisotropic value (Δ∈) falling in a range of roughly −7 to −4 and is excellent in a heat stability and a chemical stability. The compounds represented by Formulas (IV-1) and (IV-2) assume a role to reduce a threshold voltage and a viscosity in a liquid crystal composition for a TFT in which a high reliability is required.

The contents of the respective components in all the liquid crystal compositions of the present invention described above shall be explained.

The content of the component I is preferably 3 to 40% by weight, more preferably 5 to 35% by weight based on the whole weight of the composition. If it is less than 3% by weight, an absolute value of Δ∈ having a negative value in the liquid crystal composition is reduced, and the threshold voltage is elevated in a certain case. Accordingly, it is not preferred. On the other hand, if the content exceeds 40% by weight, the liquid crystal composition has a reduced clearing point (Tc) in a certain case. Accordingly, it is not preferred as well.

The content of the component II is preferably 3 to 80% by weight, more preferably 5 to 75% by weight. If it is less than 3% by weight, an absolute value of Δ∈ having a negative value in the liquid crystal composition is reduced in a certain case. Further, the liquid crystal composition may have a reduced clearing point (Tc). On the other hand, if the content exceeds 80% by weight, the liquid crystal composition is not only increased in a viscosity but also degraded in a miscibility at a low temperature in a certain case. Accordingly, it is not preferred.

The content of the component III is preferably 80% by weight or less, more preferably 70% by weight or less. If it exceeds 80% by weight, an absolute value of Δ∈ having a negative value in the liquid crystal composition is reduced, and therefore the threshold voltage is elevated in a certain case. Accordingly, it is not preferred.

The compounds which are contained as the components for the liquid crystal composition of the present invention can be synthesized by processes described in the following official gazettes.

Synthetic processes for the compound represented by Formula (III-1) are described in Japanese Patent Application Laid-Open No. 70624/1984 and Japanese Patent Application Laid-Open No. 16940/1985; a synthetic process for the compound represented by Formula (III-4) is described in Japanese Patent Application Laid-Open No. 165328/1982; and synthetic processes for the compounds represented by Formulas (IV-1) and (IV-2) are described in Japanese Patent Application Laid-Open No. 228037/1994. With respect to the compounds represented by Formulas (I), (II-1) and (II-2), synthetic processes for the compounds having a silicon bond between the rings are described in WOJP97/05144, and they can be synthesized by the same procedure as those of the compounds represented by Formulas (IV-1) to (IV-3). As described above, the respective compounds of the components constituting the liquid crystal composition of the present invention are obtained by synthesizing by prior arts.

The liquid crystal composition of the present invention can be mixed with liquid crystal compounds other than the compounds of the component I, the component II, the component III and the component IV as long as the object of the present invention is not damaged.

In general, the liquid crystal composition of the present invention is prepared by commonly used processes, and a process in which the respective components are molten each other at a high temperature is usually employed.

Added to the liquid crystal composition of the present invention are dichromatic pigments of a merocyanine base, a styryl base, an azo base, an azomethine base, an azoxy base, a quinophthalone base, an anthraquinone base and a tetrazine base, whereby it can be used as a liquid crystal composition for a guest-host (GH) mode. Or, it can be used as a liquid crystal composition for a nematic curvilinear aligned phase (NCAP) prepared by putting a nematic liquid crystal into a microcapsule and a polymer dispersed liquid crystal display element (PDLCD) represented by a polymer network liquid crystal display element (PNLCD) by forming a three-dimensional reticulate high polymer in a liquid crystal. Further, it can be used as a liquid crystal composition to which at least one chiral compound is added. In addition thereto, it can be used as a liquid crystal composition for an electrically controlled birefringence (ECB) mode and a dynamic scattering (DS) mode.

The present invention has been able to provide a liquid crystal composition having a suitable value of Δn according to a cell thickness, a low viscosity, a large negative dielectric anisotropic value, a wide nematic phase range and a high voltage-holding ratio while satisfying various characteristics required to a liquid crystal composition for an AM-LCD.

EXAMPLES

The present invention shall be explained below in detail with reference to examples, but the present invention shall not be restricted to these examples. All composition ratios shown in the examples and the comparative examples were represented by weight %, and the compounds were represented by codes based on definitions shown in Table 1.

In the characteristics of the liquid crystal composition, represented were the clearing point by $T_c$, the lower limit value of the liquid crystal phase transition temperature by $T_L$, the optical anisotropic value at 25° C. by Δn, the dielectric anisotropic value at 25° C. by Δ∈, the viscosity at 20° C. by $\eta_{20}$, and the voltage-holding ratios at 25° C. and 80° C. by VHR (25° C.) and VHR (80° C.), respectively. The $T_L$ was judged by the liquid crystal phase observed after leaving it standing in the respective freezers of 0° C., −10° C., −20° C., −30° C. and −40° C. for 30 days. The Δ∈ (=∈∥−∈⊥) was obtained by preparing a cell liquid crystal was homeotropically aligned and a cell in which a liquid crystal was homogeneously aligned to determine the ∈∥ (dielectric constant in a symmetry axis direction) and the ∈⊥ (dielectric constant in a direction vertical to the symmetry axis) respectively. The voltage-holding ratios (VHR) at 25° C. and 80° C. were measured based on an area method by preparing a TN cell (PIA-5210 manufactured by Chisso Corporation was used for an aligning membrane) to set a holding time to 16.6 msec.

TABLE 1
$$R-(A_1)-Z_1-\ldots-Z_n-(A_n)-X$$
| 1) Left side terminal group R— | Symbol |
|---|---|
| $C_nH_{2n+1}$— | n— |
| $C_nH_{2n+1}OC_mH_{2m}$— | nOm— |
| $CH_2=CHC_nH_{2n}$— | Vn— |
| 2) Bonding group —$Z_1$—, —$Z_n$— | Symbol |
|---|---|
| —$CH_2$— | 1 |
| —$SiH_2$— | Si |
| —$C_2H_4$— | 2 |
| —COO— | E |
| 3) Ring structure —(A1)—, —(An)— | Symbol |
|---|---|
|  | H |
|  | B |
| 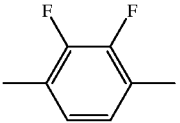 | B(2F,3F) |
| 4) Right terminal group —X | Symbol |
|---|---|
| —$C_nH_{2n+1}$ | —n |
| —$OC_nH_{2n+1}$ | —On |
| —$COOCH_3$ | —EMe |
| —$C_nH_{2n}OC_mH_{2m+1}$ | —nOm |
5) Notation example
Example 1; V2-H1SiB(2F,3F)-O2
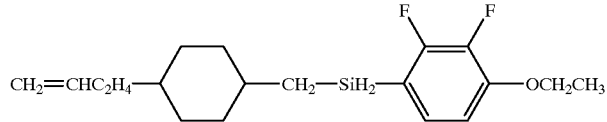
Example 2; 3-HB1SiB(2F,3F)-O2
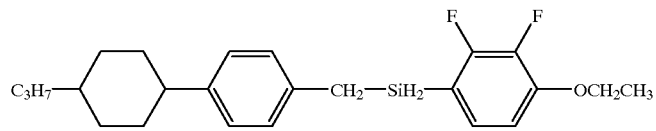
Example 3; 3-HH-EMe
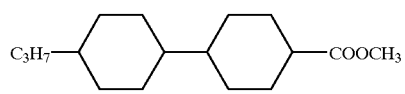

TABLE 1-continued $$R\!-\!(A_1)\!-\!Z_1\!-\!\ldots\!-\!Z_n\!-\!(A_n)\!-\!X$$

Example 4; 1O1-HBBH-4

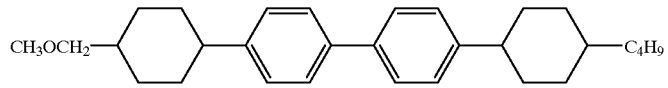

Comparative Examples

Novel compounds having a negative $\Delta \epsilon$ and examples in which the same compounds are used are described in Japanese Patent Application Laid-Open No. 228037/1994. The composition A and the composition C disclosed in Example 26 and Example 27 thereof were prepared to measure the physical property values described above.

Comparative Example 1 (Composition A)

3-HBB(2F, 3F)-1O1 10.0%

ZLI-1132(commercial liquid crystal made by Merck Co., Ltd.) 90.0%

$T_c = 74.9°$ C.

$T_L < -20°$ C.

$\Delta n = 0.139$ $\Delta \epsilon = 9.7$ $\eta_{20} = 29.2$ mPa·s

VHR(25° C.)=95.8%

VHR(80° C.)=48.5%

It can be found that the composition shown in Comparative Example 1 has a positive value of $\Delta \epsilon$ and a markedly low voltage-holding ratio (VHR).

Comparative Example 2 (Composition C)

5-HHB(2F, 3F)-1O1 10.0%

ZLI-1132(commercial liquid crystal made by Merck Co., Ltd.) 90.0%

$T_c = 77.0°$ C.

$T_L < -20°$ C.

$\Delta n = 0.133$ $\Delta \epsilon = 9.7$ $\eta_{20} = 29.1$ mPa·s

VHR(25° C.)=96.1%

VHR(80° C.)=48.7%

It can be found that the composition shown in Comparative Example 2 has a positive value of $\Delta \epsilon$ and a markedly low voltage-holding ratio (VHR).

Example 1

Prepared was a liquid crystal composition comprising:

| Component I | |
|---|---|
| 3-H1SiB(2F, 3F)—O2 | 5.0% |
| 5-H1SiB(2F, 3F)—O2 | 4.0% |
| Component II | |
| 3-HH1SiB(2F, 3F)-1 | 7.0% |
| 2-HH1SiB(2F, 3F)—O2 | 12.0% |
| 3-HH1SiB(2F, 3F)—O2 | 12.0% |
| 4-HH1SiB(2F, 3F)—O2 | 12.0% |
| 5-HH1SiB(2F, 3F)—O2 | 9.0% |
| 3-HH1SiB(2F, 3F)—O3 | 14.0% |
| 3-H1SiHB(2F, 3F)—O2 | 3.0% |
| 3-H1SiB(2F, 3F)B(2F, 3F)—O2 | 3.0% |
| Component III | |
| 3-HH-4 | 4.0% |
| 3-HB—O2 | 5.0% |
| 2-HHB-1 | 4.0% |
| 3-HHB-1 | 6.0% |

The characteristics of this composition are shown below.

$T_c = 70.5°$ C.

$T_L < -20°$ C.

$\Delta n = 0.094$ $\Delta \epsilon = -4.2$ $\eta_{20} = 26.2$ mPa·s

VHR(25° C.)=98.7%

VHR(80° C.)=98.0%

It can be found that the composition shown in Example 1 has a large negative $\Delta \epsilon$, a low viscosity and a very high voltage-holding ratio (VHR) as compared with those of Comparative Example 1 and Comparative Example 2. That is, a lot of compounds having a cyano group is contained in the compositions disclosed in Comparative Example 1 and Comparative Example 2, and therefore they have a reduced value of a voltage-holding ratio (VHR) and can not be applied to an AM-LCD. In addition thereto, they have a positive value of $\Delta \epsilon$.

Example 2

Prepared was a liquid crystal composition comprising:

| Component I | |
|---|---|
| 3-H1SiB(2F, 3F)—O2 | 5.0% |
| 5-H1SiB(2F, 3F)—O2 | 5.0% |
| Component II | |
| 3-HH1SiB(2F, 3F)—O2 | 6.0% |
| 5-HH1SiB(2F, 3F)—O2 | 6.0% |
| Component III | |
| 2-HH-3 | 3.0% |
| 3-HH-4 | 5.0% |
| 3-HB—O2 | 15.0% |

-continued

| | |
|---|---|
| 3-HB—O4 | 5.0% |
| 2-HH-EMe | 5.0% |
| 3-HH-EMe | 15.0% |
| 2-HHB-1 | 5.0% |
| 3-HHB-1 | 7.0% |
| 3-HHB-3 | 13.0% |
| 3-HHB-O1 | 5.0% |

The characteristics of this composition are shown below.

$T_c=78.6°$ C.

$T_L<-20°$ C.

$\Delta n=0.078$ $\Delta\epsilon=-1.0$ $\eta_{20}=11.6$ mPa·s

VHR(25° C.)=99.0%

VHR(80° C.)=98.0%

It can be found that the composition shown in Example 2 has a negative $\Delta\epsilon$, a low viscosity and a very high voltage-holding ratio (VHR).

Example 3

Prepared was a liquid crystal composition comprising:

| | |
|---|---|
| Component I | |
| 3-H1SiB(2F, 3F)—O2 | 16.0% |
| 5-H1SiB(2F, 3F)—O2 | 15.0% |
| Component II | |
| 3-HH1SiB(2F, 3F)—O2 | 10.0% |
| Component III | |
| 3-HH-4 | 5.0% |
| 3-HB—O2 | 10.0% |
| 2-HH-EMe | 4.0% |
| 3-HH-EMe | 12.0% |
| 2-HHB-1 | 5.0% |
| 3-HHB-1 | 7.0% |
| 3-HHB-3 | 6.0% |
| 3-HHB—O1 | 5.0% |
| Other component | |
| 1O1-HBBH-5 | 5.0% |

The characteristics of this composition are shown below.

$T_c=63.1°$ C.

$T_L<-20°$ C.

$\Delta n=0.083$ $\Delta\epsilon=-1.9$ $\eta_{20}=18.6$ mPa·s

VHR(25° C.)=98.7%

VHR(80° C.)=98.2%

It can be found that the composition shown in Example 3 has a negative $\Delta\epsilon$, a low viscosity and a very high voltage-holding ratio (VHR).

Example 4

Prepared was a liquid crystal composition comprising:

| | |
|---|---|
| Component I | |
| 3-H1SiB(2F, 3F)—O2 | 4.0% |

-continued

| | |
|---|---|
| Component II | |
| 3-H2H1SiB(2F, 3F)—O1 | 5.0% |
| 2-HH1SiB(2F, 3F)—O2 | 17.0% |
| 3-HH1SiB(2F, 3F)—O2 | 17.0% |
| 5-HH1SiB(2F, 3F)—O2 | 8.0% |
| 3-HH1SiB(2F, 3F)—O3 | 17.0% |
| 2-H1SiHB(2F, 3F)—O2 | 3.0% |
| 3-H1SiHB(2F, 3F)—O2 | 3.0% |
| Component III | |
| 2-HH-3 | 3.0% |
| 3-HB—O2 | 14.0% |
| 3-HHB-1 | 4.0% |
| 3-HHB-3 | 5.0% |

The characteristics of this composition are shown below.

$T_c=71.7°$ C.

$T_L<-20°$ C.

$\Delta n=0.097$ $\Delta\epsilon=-3.9$ $\eta_{20}=23.5$ mPa·s

VHR(25° C.)=98.8%

VHR(80° C.)=98.1%

It can be found that the composition shown in Example 4 has a negative $\Delta\epsilon$, a low viscosity and a very high voltage-holding ratio (VHR).

Example 5

Prepared was a liquid crystal composition comprising:

| | |
|---|---|
| Component I | |
| 3-H1SiB(2F, 3F)—O2 | 10.0% |
| 5-H1SiB(2F, 3F)—O2 | 10.0% |
| Component II | |
| 5-HH1SiB(2F, 3F)-1 | 4.0% |
| 2-HH1SiB(2F, 3F)—O2 | 14.0% |
| 3-HH1SiB(2F, 3F)—O2 | 14.0% |
| 5-HH1SiB(2F, 3F)—O2 | 8.0% |
| 3-H2H1SiB(2F, 3F)—O2 | 3.0% |
| 3-HH1SiB(2F, 3F)—O3 | 14.0% |
| Component III | |
| 3-HB—O2 | 6.0% |
| Other components | |
| 3-HBBH-3 | 3.0% |
| 1O1-HBBH-4 | 7.0% |
| 1O1-HBBH-5 | 7.0% |

The characteristics of this composition are shown below.

$T_c=70.7°$ C.

$T_L<-20°$ C.

$\Delta n=0.107$ $\Delta\epsilon=-3.8$ $\eta_{20}=30.1$ mPa·s

Example 6

Prepared was a liquid crystal composition comprising:

| Component | % |
|---|---|
| Component I | |
| 3-H1SiB(2F, 3F)—O2 | 12.0% |
| 5-H1SiB(2F, 3F)—O2 | 12.0% |
| Component II | |
| 3-HH1SiB(2F, 3F)—O2 | 10.0% |
| Component III | |
| 2-HH-3 | 3.0% |
| 3-HH-4 | 4.0% |
| 3-HH—O3 | 3.0% |
| 3-HB—O2 | 10.0% |
| 2-HH-EMe | 5.0% |
| 3-HH-EMe | 15.0% |
| 2-HHB-1 | 5.0% |
| 3-HHB-1 | 7.0% |
| 3-HHB-3 | 9.0% |
| 3-HHB-O1 | 5.0% |

The characteristics of this composition are shown below.

$T_c = 62.3°$ C.
$T_L < -20°$ C.
$\Delta n = 0.075$
$\Delta \varepsilon = -1.5$
$\eta_{20} = 13.5$ mPa·s

Example 7

Prepared was a liquid crystal composition comprising:

| Component | % |
|---|---|
| Component I | |
| 3-H1SiB(2F, 3F)-3 | 5.0% |
| 3-H1SiB(2F, 3F)—O2 | 4.0% |
| Component II | |
| 3-HH1SiB(2F, 3F)-1 | 7.0% |
| 2-HH1SiB(2F, 3F)—O2 | 12.0% |
| 3-HH1SiB(2F, 3F)—O2 | 12.0% |
| 4-HH1SiB(2F, 3F)—O2 | 12.0% |
| 5-HH1SiB(2F, 3F)—O2 | 9.0% |
| 3-HH1SiB(2F, 3F)—O3 | 14.0% |
| 3-HB1SiB(2F, 3F)—O2 | 3.0% |
| 3-H1SiBB(2F, 3F)—O2 | 3.0% |
| Component III | |
| 3-HB—O2 | 5.0% |
| 3-HH-EMe | 4.0% |
| 2-HHB-1 | 4.0% |
| 3-HHB-1 | 3.0% |
| 3-HHB-O1 | 3.0% |

The characteristics of this composition are shown below.

$T_c = 70.7°$ C.
$T_L < -20°$ C.
$\Delta n = 0.095$
$\Delta \varepsilon = -3.9$
$\eta_{20} = 27.8$ mPa·s

Example 8

Prepared was a liquid crystal composition comprising:

| Component | % |
|---|---|
| Component I | |
| 3-H1SiB(2F, 3F)—O3 | 5.0% |
| V2-H1SiB(2F, 3F)—O2 | 4.0% |
| Component II | |
| 3-HH1SiB(2F, 3F)-1 | 5.0% |
| 2-HH1SiB(2F, 3F)—O2 | 13.0% |
| 3-HH1SiB(2F, 3F)—O2 | 13.0% |
| 4-HH1SiB(2F, 3F)—O2 | 13.0% |
| 5-HH1SiB(2F, 3F)—O2 | 9.0% |
| V2-HH1SiB(2F, 3F)—O2 | 4.0% |
| 3-HH1SiB(2F, 3F)—O3 | 13.0% |
| Component III | |
| V2-HH-4 | 4.0% |
| 3-HB-2 | 7.0% |
| 2-HHB-1 | 4.0% |
| 3-HHB-1 | 3.0% |
| V2-HHB-1 | 3.0% |

The characteristics of this composition are shown below.

$T_c = 70.2°$ C.
$T_L < -20°$ C.
$\Delta n = 0.096$
$\Delta \varepsilon = -3.9$
$\eta_{20} = 25.8$ mPa·s

Example 9

Prepared was a liquid crystal composition comprising:

| Component | % |
|---|---|
| Component I | |
| 3-H1SiB(2F, 3F)—O2 | 4.0% |
| Component II | |
| 3-HH1SiB(2F, 3F)—O1 | 5.0% |
| 2-HH1SiB(2F, 3F)—O2 | 16.0% |
| 3-HH1SiB(2F, 3F)—O2 | 17.0% |
| 5-HH1SiB(2F, 3F)—O2 | 6.0% |
| 3-HH1SiB(2F, 3F)—O3 | 16.0% |
| Component III | |
| 3-HH-4 | 4.0% |
| 3-HB—O2 | 14.0% |
| 2-HHB-1 | 4.0% |
| 3-HHB-1 | 4.0% |
| Other components | |
| 3-HEB—O4 | 4.0% |
| 4-HEB—O2 | 3.0% |
| 5-HEB—O1 | 3.0% |

The characteristics of this composition are shown below.

$T_c = 70.0°$ C.
$T_L < -20°$ C.
$\Delta n = 0.095$
$\Delta \varepsilon = -3.3$
$\eta_{20} = 22.6$ mPa·s

Example 10

Prepared was a liquid crystal composition comprising:

| Component I | |
|---|---|
| 3-H1SiB(2F, 3F)—O2 | 5.0% |
| 5-H1SiB(2F, 3F)—O2 | 4.0% |
| Component II | |
| 3-HH1SiB(2F, 3F)-1 | 5.0% |
| 2-HH1SiB(2F, 3F)—O2 | 12.0% |
| 3-HH1SiB(2F, 3F)—O2 | 12.0% |
| 5-HH1SiB(2F, 3F)—O2 | 8.0% |
| 3-HH1SiB(2F, 3F)—O3 | 12.0% |
| Component III | |
| 3-HB—O2 | 9.0% |
| 3-HHB-1 | 7.0% |
| 3-HHB-3 | 5.0% |
| Component IV | |
| 3-HB(2F, 3F)—O2 | 4.0% |
| 5-HB(2F, 3F)—O2 | 4.0% |
| 3-HHB(2F, 3F)—O2 | 5.0% |
| 5-HHB(2F, 3F)—O2 | 5.0% |
| 3-HBB(2F, 3F)—O2 | 3.0% |

The characteristics of this composition are shown below.
$T_c$=75.1° C.
$T_L$<−20° C.
Δn=0.096
Δ∈=−3.8
$\eta_{20}$=26.9 mPa·s

Example 11

Prepared was a liquid crystal composition comprising:

| Component I | |
|---|---|
| 3-H1SiB(2F, 3F)—O2 | 5.0% |
| 5-H1SiB(2F, 3F)—O2 | 4.0% |
| Component II | |
| 3-HH1SiB(2F, 3F)-1 | 5.0% |
| 2-HH1SiB(2F, 3F)—O2 | 12.0% |
| 3-HH1SiB(2F, 3F)—O2 | 12.0% |
| 5-HH1SiB(2F, 3F)—O2 | 8.0% |
| 3-HH1SiB(2F, 3F)—O3 | 12.0% |
| Component III | |
| 3-HB—O2 | 9.0% |
| 2-HHB-1 | 5.0% |
| 3-HHB-1 | 7.0% |
| Component IV | |
| 3-HB(2F, 3F)—O2 | 5.0% |
| V2-HB(2F, 3F)—O2 | 3.0% |
| 3-HHB(2F, 3F)—O2 | 7.0% |
| V2-HHB(2F, 3F)—O2 | 3.0% |
| V2-HBB(2F, 3F)—O2 | 3.0% |

The characteristics of this composition are shown below.
$T_c$=74.0° C.
$T_L$<−20° C.
Δn=0.097
Δ∈=−3.7
$\eta_{20}$=26.5 mPa·s

What is claimed is:

1. A liquid crystal composition comprising a component I comprising at least one compound selected from the group of compounds represented by Formula (I) and a component II comprising at least one compound selected from the group of compounds represented by Formulas (II-1) and (II-2):

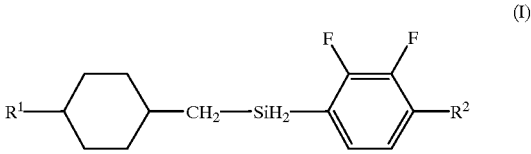
(I)

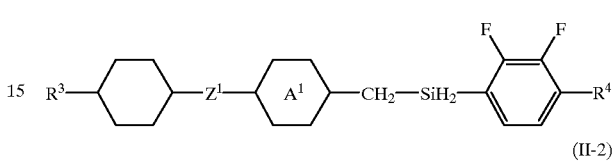
(II-1)

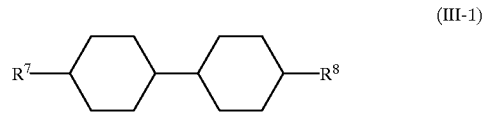
(II-2)

wherein $R^1$, $R^3$ and $R^5$ each represent independently an alkyl group having 1 to 10 carbon atoms or an alkenyl group having 2 to 10 carbon atoms; $R^2$, $R^4$ and $R^6$ each represent independently an alkyl group or alkoxy group having 1 to 10 carbon atoms or an alkenyl group having 2 to 10 carbon atoms; $Z^1$ and $Z^2$ each represent independently a single bond or —CH$_2$CH$_2$—; and rings $A^1$ and $A^2$ each represent independently trans-1,4-cyclohexylene, 1,4-phenylene or 1,4-phenylene in which at least one hydrogen atom is substituted with a fluorine atom.

2. A liquid crystal composition as described in claim 1, wherein the component I accounts for 3 to 40% by weight, and the component III accounts for 3 to 80% by weight each based on the whole weight of the liquid crystal composition.

3. A liquid crystal composition as described in any one of claims 1 and 2, comprising a component III comprising at least one compound selected from the group of compounds represented by Formulas (III-1), (III-2), (III-3) and (III-4):

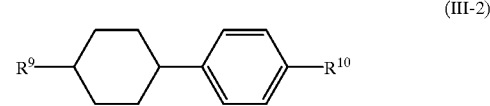
(III-1)

(III-2)

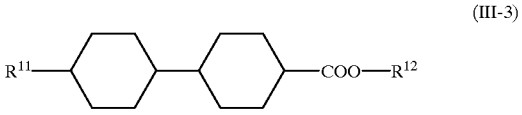
(III-3)

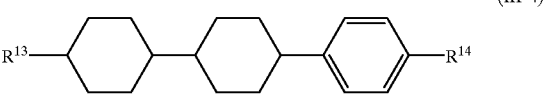
(III-4)

wherein $R^7$, $R^9$, $R^{11}$ and $R^{13}$ each represent independently an alkyl group having 1 to 10 carbon atoms or an alkenyl group having 2 to 10 carbon atoms; and $R^8$, $R^{10}$, $R^{12}$ and $R^{14}$ each represent independently an alkyl group or alkoxy group having 1 to 10 carbon atoms or an alkenyl group having 2 to 10 carbon atoms.

4. A liquid crystal composition as described in claim 3, comprising the component I of 3 to 40% by weight, the component II of 3 to 80% by weight and the component III of 1 to 80% by weight each based on the whole weight of the liquid crystal composition.

5. A liquid crystal composition as described in any one of claims 3 and 4, comprising a component IV comprising at least one compound selected from the group of compounds represented by Formulas (IV-1), and (IV-2):

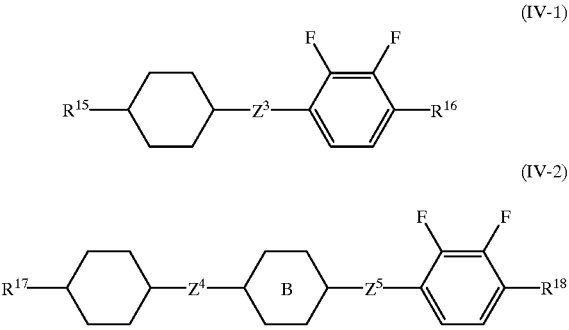

wherein $R^{15}$ and $R^{17}$ each represent independently an alkyl group having 1 to 10 carbon atoms or an alkenyl group having 2 to 10 carbon atoms; $R^{16}$ and $R^{18}$ each represent independently an alkyl group or alkoxy group having 1 to 10 carbon atoms or an alkenyl group having 2 to 10 carbon atoms; $Z^3$, $Z^4$ and $Z^5$ each represent independently a single bond or —$CH_2CH_2$—; and a ring B represents 1,4-phenylene or trans-1,4-cyclohexylene.

6. A liquid crystal display element comprising the liquid crystal composition as set forth in any one of claims 1, 2 and 4.

7. A liquid crystal display element comprising the liquid crystal composition as set forth in claim 3.

8. A liquid crystal display element comprising the liquid crystal composition as set forth in claim 5.

\* \* \* \* \*

UNITED STATES PATENT AND TRADEMARK OFFICE
CERTIFICATE OF CORRECTION

PATENT NO. : 6,399,164 B1
DATED : June 4, 2002
INVENTOR(S) : Motoki Yanai et al.

It is certified that error appears in the above-identified patent and that said Letters Patent is hereby corrected as shown below:

<u>Column 18,</u>
Line 36, change "III" to -- II --.

Signed and Sealed this

Thirtieth Day of July, 2002

Attest:

Attesting Officer

JAMES E. ROGAN
*Director of the United States Patent and Trademark Office*